United States Patent
Gates et al.

(10) Patent No.: US 6,240,482 B1
(45) Date of Patent: May 29, 2001

(54) HOST ADAPTER HAVING A PLURALITY OF REGISTER SETS AND CORRESPONDING OPERATING NODES

(75) Inventors: Stillman F. Gates, Los Gatos; Uday N. Devanagundy, Hayward, both of CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/089,044

(22) Filed: Jun. 2, 1998

(51) Int. Cl.[7] .................................................. G06F 13/38
(52) U.S. Cl. ................................... 710/130; 711/173
(58) Field of Search .................................... 711/1, 2, 202, 711/209, 220, 153, 173; 710/130

(56) References Cited

U.S. PATENT DOCUMENTS

| | | | |
|---|---|---|---|
| 4,217,638 | * 8/1980 | Namimoto et al. | 711/220 |
| 5,274,834 | * 12/1993 | Kardach et al. | 710/260 |
| 5,455,919 | * 10/1995 | Brewer et al. | 709/301 |

OTHER PUBLICATIONS

"Memory Management and Multitasking Beyond 640K", Bales et al, ISBN 0–8306–3476–2, 1992.*
"Intel Microprocessors, vol. II", ISBN 1–55512–150–0, 1991.*

* cited by examiner

*Primary Examiner*—Hiep T. Nguyen
(74) *Attorney, Agent, or Firm*—Skjerven Morrill MacPherson LLP; David Millers (57) ABSTRACT

A memory architecture for a circuit such as a host adapter provides sections of memory used for different types of information and programmable sizes for the sections. Thus, the circuit can adapt memory configurations for different applications. Each section is divided into pages, and for each section, the circuit has a range of internal addresses that map to a current page in the section. Additionally, the circuit has several operating modes and several register sets. Each mode has a set of functions that the circuit performs and a register set that the circuit can access while operating in the mode. Currently accessible pages in the memory are selected according to the operating mode. In particular, the register sets include registers for pointers that identify pages currently accessible. When the circuit switches modes, the accessible register set changes, and changing the register set changes the pointers and which pages are accessible. Generally, the accessible register set and memory pages are selected according to the function of the mode. Accordingly, the internal address space for accessing registers and memory can be minimized, since only the registers and pages needed for the functions of a mode are accessible while the circuit operates in the mode.

13 Claims, 4 Drawing Sheets

Microfiche Appendix Included
(1 Microfiche, 29 Pages)

HOST ADAPTER HAVING A PLURALITY OF REGISTER SETS AND CORRESPONDING OPERATING NODES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

MICROFICHE APPENDIX

The disclosure includes one sheet of microfiche having 29 frames. The microfiche appendix contains a listing of Verilog Code for a portion of a memory port interface including a module that generates external memory address in accordance with an embodiment of the invention.

BACKGROUND

1. Field of the Invention

This invention relates to a circuit architecture that maps an internal address space into an external address space, where the mapping adapts according to the application of the circuit and according to a current operating mode of the circuit.

2. Description of Related Art

Many digital circuits access memory and other resources using addresses that identify an accessible source or destination of a digital signal. The addresses that uniquely identify the accessible sources and destinations for signals can be referred to as the external address space for the circuit. For large external address spaces, the number of address bits required to uniquely identify a specific source or destination can be relatively large. Typically, the circuit requires address buses, address registers, and associated logic having sufficient width to access any location in the local external address space. Thus, making a circuit having a large external address space increases circuit area, complexity, and cost.

To reduce the number of address bits used in a circuit, the external address space can be divided into pages with only one page being accessed at a time, and the circuit can use an internal address space that is sufficient to identify a storage location within a current page. Thus, most address buses, registers, and logic in the circuit can be limited to the number of bits required to uniquely identify a location in a page. Such circuits additionally require page selection logic, which selects the current page for accessed, but the circuit area of the page selection logic is often less than circuit area saved by the reduction in the number of address bits handled elsewhere in the circuit. Thus, a paged external address space or memory can reduce the overall circuit size and cost.

A disadvantage of a paged external address space is that not all addresses are simultaneously accessible, and accessing required information may require frequent page changes. Such page changes can slow memory access and reduce performance of a circuit. A memory architecture is desired that minimizes the number of address bits required for the internal address space of a circuit, is compatible with a large external address space, and does not require frequent page changes to locate required information.

SUMMARY

In accordance with the invention, a memory architecture for a circuit such as a host adapter provides sections of external memory used for different types of information and programmable sizes for the sections so that the circuit can adapt to different applications. Each external memory section is divided into pages, and for each section, the circuit has a range of internal addresses that maps to a current page in the external memory section. Additionally, the circuit has several operating modes and several register sets. Each mode has a set of functions that the circuit performs and a register set that the circuit can access while operating in the mode. Thus, the available register set is selected according to the operating mode of the circuit (or equivalently according to the current function of the circuit). Currently accessible pages in the memory are also selected according to the operating mode. In particular, for a section that includes one page per mode, the memory architecture can directly use a mode number to select a page in the section. Alternatively, the register sets include registers for pointers that identify pages currently accessible in the sections. When the circuit switches modes, the accessible register set changes, and changing the register set changes the pointers to those stored in the new register set Thus, the accessible pages change. Generally, which registers are in the accessible register set and the contents of accessible memory pages are selected according to the function of the mode. Accordingly, the internal address space for accessing registers and memory can be minimized since registers and memory pages that are unnecessary for the functions of a mode can be removed from the internal address space.

In one embodiment of the invention, a circuit includes a memory, several register sets, and a circuit that accesses the memory and the register sets using internal addresses. The circuit is operable in several modes, where each mode has a mapping from internal addresses to memory locations and the registers. Specifically, each register set corresponds to one of the modes and is accessible when the circuit operates in the mode corresponding to the register set. Additionally, the memory includes sections that are partitioned into pages, and the circuit accesses one page in each section using a range of internal addresses associated with the section. In at least some of the sections, the selection of the accessible page depends on the mode. For example, each register set can include a register that identifies a page in a particular section. When the circuit changes modes, a different register becomes accessible and may identify a different page in the section.

In accordance with a further aspect of the invention, the circuit may be operable simultaneously in a first mode for read access and a second mode for write access. Accordingly, the circuit can read from one set of registers and write to another set of registers to move information from one register set to another. The circuit may further include a set of global registers that the circuit unit can access in any mode. One example of a global register is a mode register that identifies a current mode in which the circuit unit is operating. The mode register can directly select currently accessible pages in one or more of the memory sections.

As another aspect of the invention, a configuration register controls sizes of the various memory sections. This allows the memory architecture to adapt the various memory sections as required for the configuration of external memory and the specific applications of the circuit.

Another embodiment of the invention is a host adapter that includes: a sequencer operable in a first mode for transfers to or from a host computer and in a second mode for transfers to or from a peripheral bus. The host adapter further includes a first register set and a second register set coupled to the sequencer for access in the first mode and the second mode, respectively. Each register set is tailored for the functions performed in the respective modes and occupies the same range of internal addresses. Accordingly, including only the necessary registers in each set reduces the range of internal addresses.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a circuit such as a host adapter having an attached external memory includes a protocol engine that operates in several different modes. Each mode performs different types of tasks. For example, an exemplary host adapter has separate modes for sending data to a peripheral device, receiving data from a peripheral device, sending data to a host system, receiving data from the host system, and performing direct memory access (DMA) transfers between local memory and main memory of the host. The host adapter has a memory access architecture where most circuit units use an internal address space which is smaller than the external address space of the attached resources. The memory architecture selects from a set of mappings a mapping of the internal address space into the external address space. The mode of operation of the host adapter is in factor in the selection of the mapping.

A mapping for a mode makes available the information required for the types of operations performed in the mode, unnecessary information, such as information for tasks or functions not performed in the mode, can be made unavailable in favor of more useful information. For example, the local memory contains several scratchpad areas, one for each mode, and the address mapping for a mode maps internal addresses for scratch information to the scratch area for that mode. Other scratch areas are accessible at the same internal addresses but only when operating in the other modes. For other external memory sections, the architecture provides a set of page pointers, typically including one page pointer per mode. Each page pointer for a section can point to a different page in the section. The address mapping for a mode maps the internal addresses allocated for a section to a page identified by the page pointer associated with the section and the mode. Use of the distinct address mappings for the various modes simplifies context switching when a protocol engine switches from one task to another.

Additionally, the address mappings are adaptable according to the application of a host adapter. For example, an external memory section contains transfer control blocks where each transfer control block (TCB) corresponds to a page in the section. A TCB pointer for the current mode selects a transfer control block (i.e., a TCB page) that currently corresponds to a portion of the internal address space. Other external memory sections contain pages dedicated for other types of information such as fiber channel and general parameter values. The number of pages in each section is programmable to select the amount of memory for each type of information as required to suit different applications.

Figure 1:
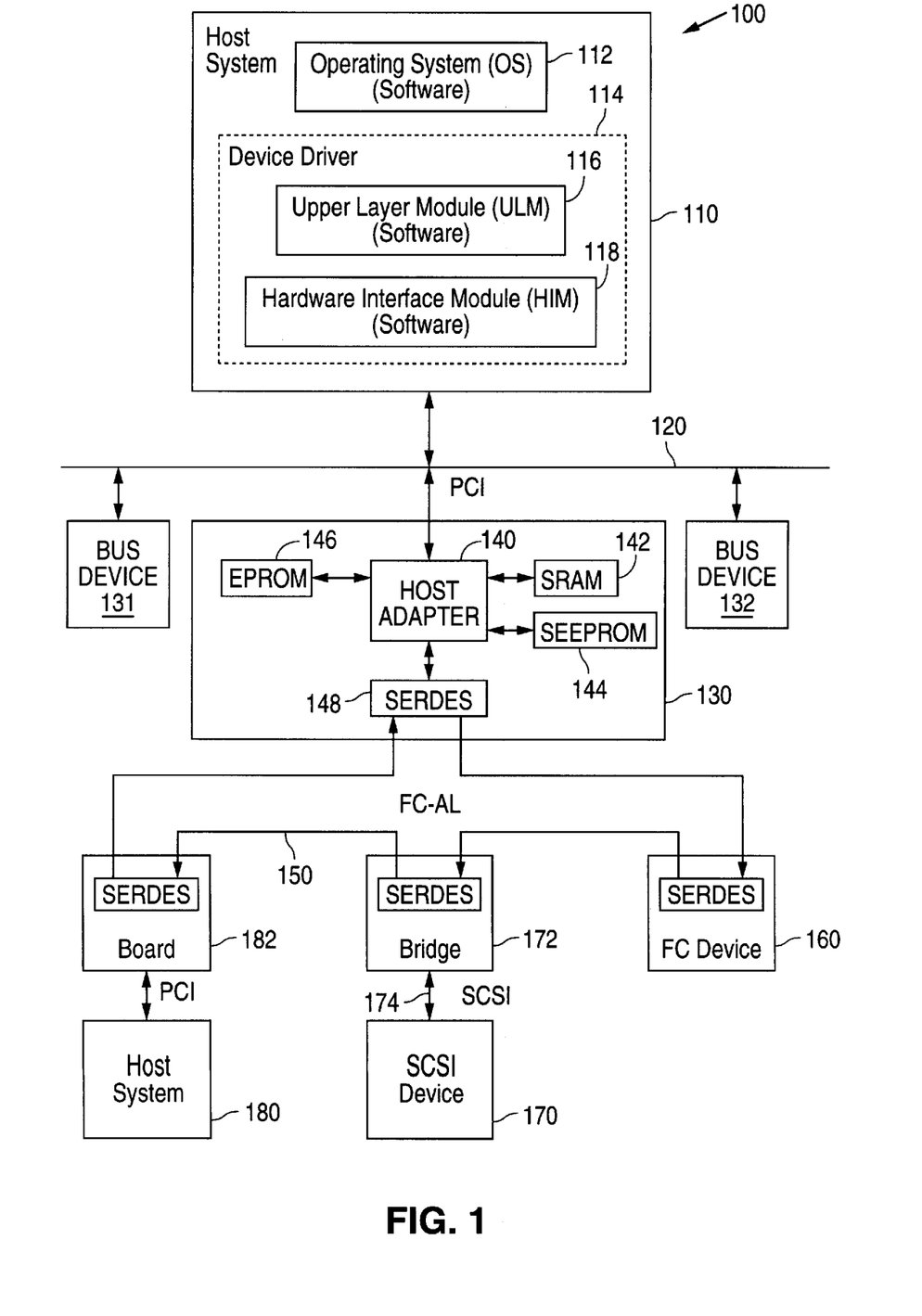
FIG. 1 is a block diagram of a computer system including a system bus device and a host adapter in accordance with an embodiment of the invention.

FIG. 1 shows a computing system 100 including a host adapter 140 in accordance with an embodiment of the invention. Computing system 100 includes a host computer 110, which has a system bus 120 to which bus devices 130 to 132 connect. Bus device 130 includes a serializer/deserializer (SERDES) 148 that connects to a peripheral bus 150, host adapter 140 for control of the peripheral bus 150, and local memory for information used by host adapter 140 and host computer 110. Host computer 110 can communicate via device 130, with devices 160, 170, and 180 that connect to peripheral bus 150. In particular, host computer 110 executes software including an operating system 112 and a device driver 114 for devices 160, 170, and 180. Device driver 114 includes a hardware interface module (HIM) 118 that communicates with device 130 via bus 120 and an upper layer module (ULM) 116 that communicates with devices 160, 170, and 180 via HIM 118 and device 130.

In an exemplary embodiment of the invention, host computer 110 is a personal computer, system bus 120 is an industry standard peripheral component interconnect (PCI) bus, and bus 150 is a fiber channel (FC) bus. Device 130 is a PCI board in host computer 110. As an example application, devices 160, 170, and 180, which connect to bus 150, are respectively a fiber channel device such as a disk drive or a fiber channel hub, a SCSI device such as a hard drive, CD ROM drive, or DVD ROM drive which connects to bus 150 via a bridge circuit 172, and another computer system 180 having a board 182 for connection and communications via fiber channel bus 150.

Host adapter 140 is a programmable integrated circuit that includes a multi-tasking protocol engine. The protocol engine executes firmware required for control communications between host computer 110 and devices on bus 150. Coupled to host adapter 140 is a local memory including volatile memory 142 and non-volatile memory 144 and 146. The non-volatile memory includes a conventional EPROM, EEPROM or Flash memory 146 for information such as a BIOS the host uses for device 130 and an SEEPROM 144 for critical configuration information and non-critical information. Depending on the application of host adapter 140, either host computer 110 loads the firmware for the protocol engine in an instruction memory in host adapter 140, or host adapter 140 loads firmware from non-volatile memory 146 into the on-chip instruction memory.

Volatile memory 142 stores information such as transfer control blocks (TCBs) and scatter/gather (S/G) lists for transfers to and from SCSI device 170, end-to-end credit values, page variables, and scratch memory for a protocol engine in host adapter 140. Volatile memory 142 can be any sort of conventional memory such a DRAM or an SRAM. In the exemplary embodiment of the invention, memory 142 is synchronous SRAM that includes one or more 64k-by-18-bit chips such as a 93C46 or 93C66 available from Atmel, Inc. Accordingly, in the exemplary embodiment of the invention, the minimum range of physical addresses for memory 142 is from 0000h to FFFFh plus a byte select bit for selecting a high or low byte from the 2-byte storage location. (Herein, the suffix "h" designates a hexadecimal number.) As discussed further below, internal addresses used in the exemplary host adapter are only 9 bits wide and select byte addresses. An address mapping between the internal addresses and the physical addresses of volatile memory 142 depends on the operating mode of host adapter 140.

Figure 2:
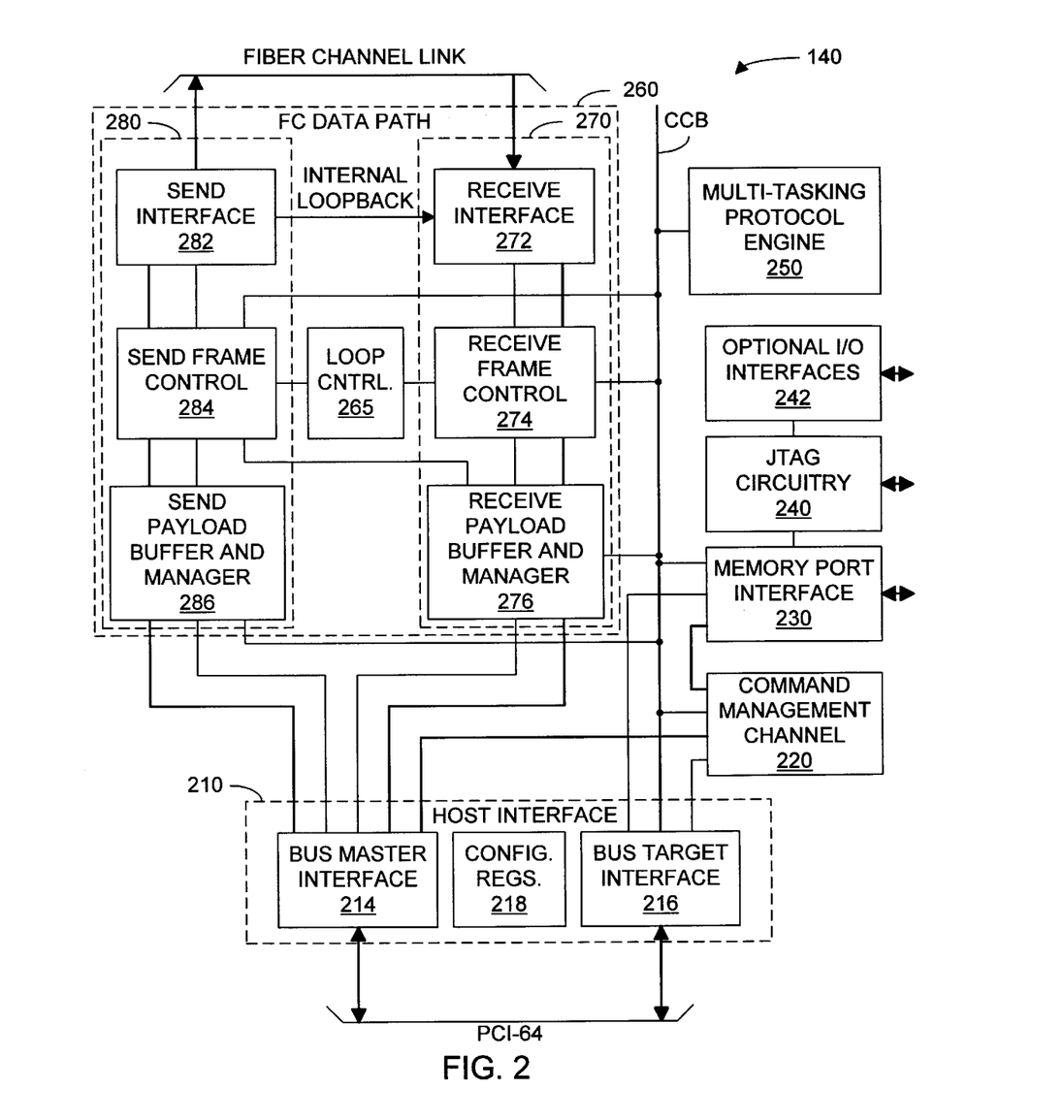
FIG. 2 is a block diagram of the host adapter shown in FIG. 1.

FIG. 2 is a block diagram of the exemplary embodiment of host adapter 140. In the exemplary embodiment, host adapter 140 includes a host interface 210, a command management channel (CMC) 220, a memory port interface (MPI) 230, a multi-tasking protocol engine (MTPE) 250, and a fiber channel data path 260. Host interface 210 connects to system bus 120 and implements PCI bus protocols that permit adapter 140 to act as either the bus master or target As illustrated in FIG. 2, host interface 210 includes a bus master interface 214 that implements PCI bus protocols for a bus master and a bus target interface 216 that implements the protocols for a target on PCI bus 120. Configuration registers 218 contain configuration data for PCI interface 210 including a device base address, an IRQ, and configuration data for host adapter 140. In alternative embodiments of the invention, host interface 210 can employ any alternative host interface architecture including PCI interface circuits that are known in the art.

Data path 260 is the path for information sent or received via a fiber channel link (i.e., peripheral bus 150). As shown in FIG. 2, data path 260 includes a receive data path 270 for information received from the fiber channel link, a send data path 280 for information to be sent on the fiber channel link, and a loopback control circuit 265 for self-testing. Co-filed U.S. patent application Ser. Nos. 09/089,311, 09/089,274 and 09/089,030 now U.S. Pat. No. 6,070,200 further describe the operation of an exemplary embodiment of data path 260 and components therein and are hereby incorporated by reference herein in their entirety.

MTPE 250 is a sequencer that controls information transfers such as defined by transfer control blocks (TCBs) and scatter/gather (S/G) lists in local memory. MTPE 250 is multi-tasking in that MTPE 250 can control multiple simultaneously pending transfers. Co-filed provisional U.S. patent application entitled "Fast Stack Save and Restore System and Method", Ser. No. 60/0087,701 further describes operation of a processing engine and is hereby incorporate by reference in its entirety.

Command management channel 220 handles DMA transfers and contains a buffer and a DMA control circuit. DMA transfers are between the main memory of the host computer and the buffer in CMC 220 and between the buffer in CMC 220 and local memory 142. Accesses of local memory 142 are through memory port interface 230. Host computer 110 and command management channel 220 store TCBs and S/G lists in local memory 142 via DMA transfers. In the exemplary embodiment of the invention, the buffer in CMC 220 is 128 bytes, and the DMA control circuit handles DMA transfers of blocks up to 128 bytes, which is the size of a standard TCB for the exemplary embodiment of the invention. Co-filed U.S. patent application entitled "Host Adapter Including Interrupt Posting Structure", Ser. No. 09/089,068, now U.S. Pat. No. 6,085,278 describes further a host adapter with a command manage channel for DMA transfers and is hereby incorporated by reference in its entirety. CMC 220 has a direct connection to memory port interface 230 to facilitate DMA transfers that do not interfere with other communications on a main internal bus CCB. CMC 220 can also access local memory via bus CCB to memory port interface 230.

Bus CCB is a cooperative communication bus that connects to MTPE 250, memory port interface 230, data path 260, CMC 220, and host interface 210. Co-filed U.S. patent application entitled "Source-Destination Re-timed Cooperative Communication Bus", Ser. No. 09/088,812 describes a suitable internal bus architecture and is hereby incorporated by reference in its entirety. To access local memory, protocol engine 250 must first acquire control of bus CCB from an arbitrator (not shown). Protocol engine 250 can then use an internal address to access a storage location in local memory via memory port interface 230. Host interface 210 or CMC 220 can similarly acquire control of bus CCB and access local memory via memory port interface 230. Access of storage locations in local memory is direct in that an internal address from MTPE 250 map to specific storage locations. MTPE 250 does not need to write a memory address to an address register while the internal address from MTPE 250 identifies the address register.

Memory port interface 230 provides an interface to local memory including volatile memory 142 and non-volatile memory 144 and 146. U.S. patent application 09/089,057, now U.S. Pat. No. 6,148,384 further describes a suitable memory port interface for the exemplary embodiment of the invention and is hereby incorporated by reference in its entirety. Memory port interface 230 also controls a test port 240 and other I/O interfaces 242. Test port 240 includes JTAG circuitry for JTAG testing and provides for initiation and output of results of self tests performed within host adapter 140. I/O interfaces 242 implement functions including a general purpose interface, an external request interface, an activity indicator interface, and a monitor interface. The general purpose interface includes generic, addressable pins for input and output signals. The external request interface provides for an external pause request and acknowledge for Peek/Poke operations, a firmware load request and acknowledge, and an external interrupt of host adapter 140. The activity indicator interface is an LED indicator output port for indicating the activity of host adapter 140. The monitor interface allows selection of internal signals from within host adapter 140 for external monitoring. The monitor port interface is generally for debugging of host adapter 140 during initial design and testing. Co-filed U.S. patent application Ser. No. 09/089,278 describes a monitor port with selectable trace support which the exemplary embodiment of the invention employs and is hereby incorporated by reference in its entirety. Interfaces 240 and 242, while useful, are not required and can be omitted. Additionally, other types of interfaces can be added according to the functions and desired testability of adapter 140.

In accordance with an aspect of the invention, MTPE 250 is operable in several different modes, and the mode of operation determines which portions of local memory 142 processing engine 250 can directly access. In the exemplary embodiment, the operating modes of processing engine 250 include a DMA mode (mode 0), two fiber channel receive modes (mode 1 and 5), a host receive mode (mode 2), a fiber channel send mode (mode 3), and a host send mode (mode 4). Two additional modes (mode 6 and 7) are reserved for future expansion. Mode 0 is for DMA transfers. Modes 1, 3, and 5 are primarily for communications on the fiber channel link. Modes 2 and 4 are primarily for communications with the host system. Regardless of the mode, MTPE 250 uses 9-bit internal addresses which range from 000h to 1 FFh. The internal addresses directly correspond to registers in host adapter 140 and storage locations in local memory (SRAM) 142. Non-volatile memory 144 and 146 is not directly accessible. In the exemplary embodiment of the invention, a serial EEPROM interface in memory port interface 230 includes a control register SEECTL, an address register SEEADR, and a data register SEEDAT0-1. Registers SEECTL, SEEADR, and SEEDAT0-1 are in the internal address space of MTPE in mode 4. To access the serial EEPROM, MTPE 250 writes a SEEPROM address to SEEADR and data is transferred via register SEEDAT0-1. Further, above-incorporated patent application Ser. No. 09/089,057, now U.S. Pat. No. 6,148,384 further describes the SEEPROM interface.

Figure 3:
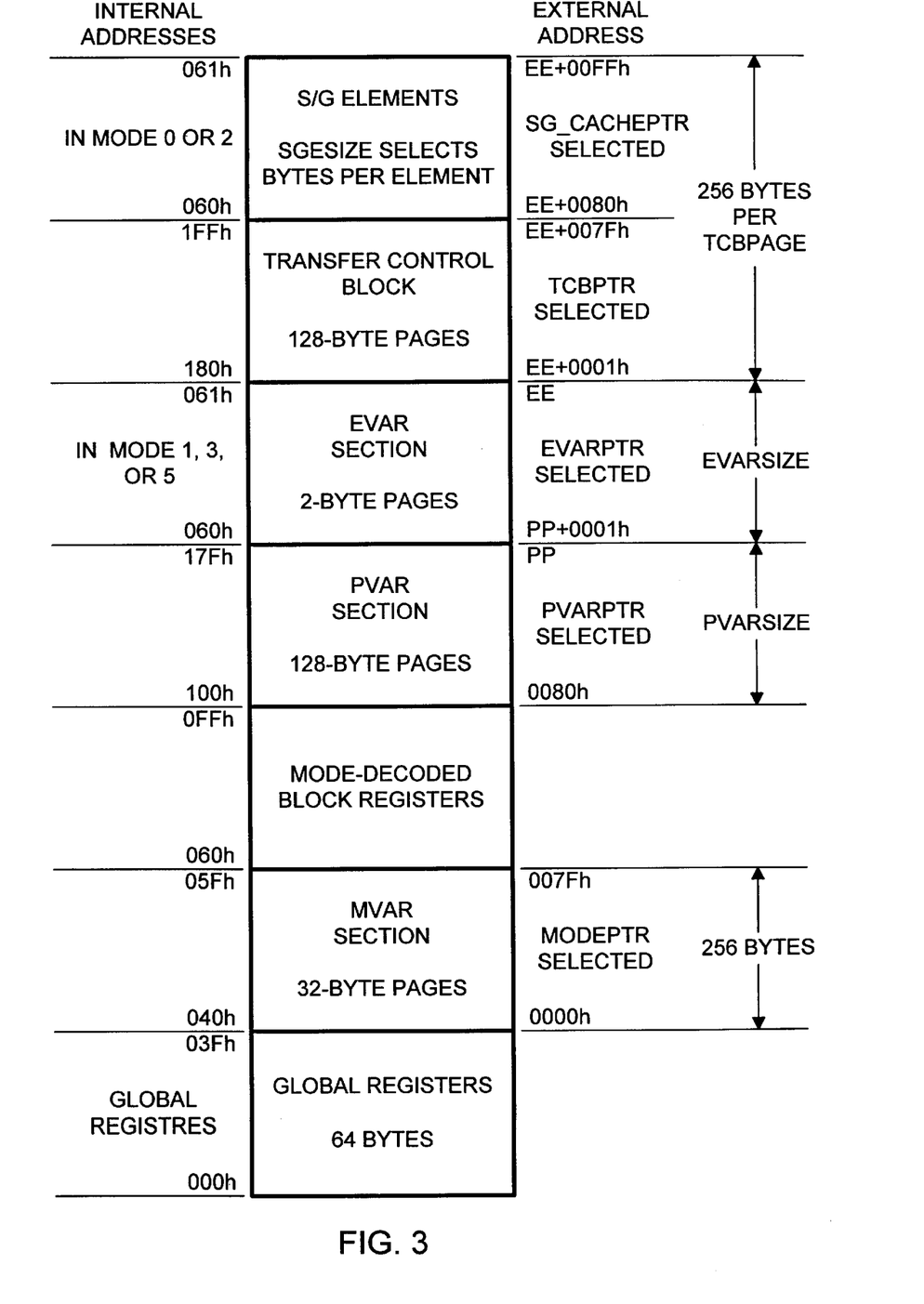
FIG. 3 shows a subdivision of a local memory into sections for specific uses in accordance with an embodiment of the invention.

FIG. 3 illustrates memory maps of the internal address space into an external address space including local memory 142. In the exemplary embodiment, MTPE 250 uses a 9-bit internal address space, and portions of the 9-bit internal address space correspond to selected pages in sections of memory 142. Memory 142 includes four sections that are referred to herein as the MVAR, PVAR, EVAR, and TCB sections. The size of each section depends on memory configuration data and can be adjusted for the size of memory 142 and the application of host adapter 140. For the purpose of illustration, FIG. 3 illustrates the case where memory 142 is a 64×18-bit memory that has 16-bit addresses ranging from 0000h to FFFFh. Thus, in FIG. 3, the internal addresses identify 1-byte storage locations, and the external addresses identify 2-byte storage locations. (Two of the 18 bits are parity bits.) In the exemplary embodiment of the invention, volatile memory 142 is up to 384 Kbytes of storage. Each section of memory 142 is subdivided into pages where the size of a page typically depends on the range of internal addresses used to access information of the type stored in the page. The address mapping depends on the operating mode of MTPE 250, a set of pointers, and the memory configuration data as described below.

As shown in FIG. 3, the internal addresses are partitioned into several blocks. The lowest address block, address from 000h to 03Fh, corresponds to global registers which MTPE 250 can access in any operating mode and which do not change when the operating mode changes. Thus, each internal address from 000h to 03Fh corresponds to a specific register or an internal RAM (buffer) in host adapter 140 (or is reserved for expansion). The global registers include registers that MTPE 250 needs for most or all operating modes. For example, the global registers include an accumulator, a flag register, and an instruction address register. Another global register, register MODEPTR, contains a value indicating a current operating mode of MTPE 250. In the exemplary embodiment, register MODEPTR stores a 3-bit value in the ranges from 0 to 7 for the eight operating modes of MTPE 250. The mode pointer can include two values a source mode and a destination mode respectively indicating a mode for reading and a mode for writing. Typically, the source and destination modes are the same. As described below, the memory access architecture uses register MODEPTR when selecting pages in memory 142 that correspond to selected portions of the internal address space.

The internal address block from 040h to 05Fh corresponds to scratch memory that is mapped into a 32-byte page in the MVAR section of memory 142. MTPE 250 uses an MVAR page as a scratchpad for "mode" variables, which are variables used when operating in a specific mode. The MVAR section of memory 142 has a fixed size of 256 bytes and is at external addresses from 0000h to 007Fh. (There are 2-bytes per external address.) An external address EA corresponding to an internal address IA in the range 40h to 5Fh is the sum of the internal address IA and an offset that depend on the value in register MODEPTR. When MTPE 250 switches between tasks, the mode changes (i.e., the contents of register MODEPTR changes), and the internal address 40h to 5Fh correspond to different MVAR page. The mode variables in the old MVAR page become inaccessible and are preserved for later use if the task is resumed. Accordingly, use of register MODEPTR to select a MVAR page facilitates contexts switching for multi-tasking.

Internal addresses 060h to 0FFh are for block registers required in or for circuit blocks such as host interface 210, CMC 220, memory port interface 230, MTPE 250, and data path 260 of FIG. 2. The block registers generally access locations in host adapter 140, but as described below, some of the block registers are storage locations in external memory 142. The block registers are decoded or selected according to the operating mode of MTPE 250. Accordingly, in different modes, MTPE 250 has access to different block registers. Co-filed U.S. patent application entitled "Register Partitioning in Multi-Tasking Host Adapters", Serial No. 09/089,031, now U.S. Pat. No. 6,026,959, describes methods for using a mode pointer to select a register set and is incorporated by reference herein in its entirety.

The block registers accessible in a mode are selected to be those required for the functions of the mode. For example, one function for mode 0 is accessing an external serial EEPROM, and MTPE 250 does not access the serial EEPROM when operating in modes 1 to 7. In mode 0, MTPE 250 uses internal address 068h, 069h, and 06Ah for registers SEECTL, SEEADR, and SEEDAT which are respectively control, address, and data registers in a serial EEPROM interface within memory port interface 230. In the other modes, internal addresses 068h, 069h, and 06Ah correspond to other registers having other functions, and MTPE 250 cannot access registers SEECTL, SEEADR, and SEEDAT. For example, in mode 1, addresses 068h, 069h, and 06Ah correspond to registers that describe an ID number for the host adapter for fiber channel communications. More generally, in each mode, MTPE 250 has access to the block registers that are needed for the selected functions of the mode. Registers not required for the functions selected for the mode do not need to be available. Accordingly, the number of internal addresses for block registers can be reduced by using the same internal addresses for different registers.

MTPE 250 uses internal addresses 100h to 17Fh to access a page in the PVAR section of memory 142. The PVAR section is immediately adjacent the MVAR section and accordingly begins at an external address 0080h. MTPE 250 uses PVAR pages as scratch pads for variables which may be required in more than one mode. The size of the PVAR section depends on memory configuration data as indicated in a block register SIZESELECT which MTPE 250 can access in mode 4. (MTPE 250 uses mode 4 during initialization where the host sends initialization information to the host adapter.) Register SIZESELECT includes two bits for selecting one of four possible sizes of the PVAR section. The possible sizes are two, four, eight, and sixteen 128-byte pages. The external addresses of the PVAR section range from 0080h to an upper limit PP, which is 00FFh, 017Fh, 027Fh, or 047Fh, depending on the size of the PVAR section. A global register PVARPTR contains a pointer that selects the page in the PVAR section that currently corresponds to internal addresses 100h to 17Fh. The PVAR page does not change when MTPE 250 changes modes, but MTPE 250 can switch between pages for context switching or if one PVAR page is insufficient.

The EVAR section, if present, is immediately adjacent the PVAR section and accordingly begins at an external address equal to PP+0001h. The top of the EVAR section is at an external address EE which depends on the amount of memory 142 allocated for the EVAR section. The EVAR section has a size that depends on memory configuration data in global register SIZESELECT. In particular, register SIZESELECT includes two bits for selecting one of four possible sizes of section EVAR. The possible sizes are 0, 128, 256, and 512 2-byte pages. MTPE 250 uses the EVAR section for end-to-end credit values. End-to-end credit is the maximum number of data frames which can be transferred in specific circumstances according to the fiber channel protocol. (An ANSI publication entitled "Fiber channel Physical and Signaling Interface ($F_C$-$P_H$), from the X3T11 technical committee, describes the fiber channel protocol and is hereby incorporated by reference in its entirety.) The pages in the EVAR section are only accessible when MTPE 250 operates in the fiber channel modes (mode numbers 1, 3, and 5). In mode 1, 3, or 5, MITE 250 uses internal addresses 60h and 61h to access individual bytes from a current 2-byte EVAR page. The external address for the current EVAR page is determined from a block register EVARPTR (internal address 066h) which contains a pointer to the current EVAR page. Unlike the PVAR page, the EVAR page changes when MTPE 250 changes operating mode because the fixed internal address of register EVARPTR corresponds to a different register in each mode.

After the EVAR section or the PVAR section if there is no EVAR section, the remainder of memory 142 contains a TCB section for transfer control blocks and scatter/gather lists. The base address of the TCB section is EE+00001h where address EE is the same as address PP if the EVAR section has size zero. In the exemplary embodiment, the TCB section is partitioned into 256-byte areas where each area contains a 128-byte TCB page and a 128-byte SIG list. MTPE 250 uses internal addresses 180h to 1FFh for a current TCB page. The external address of a location in the current TCB page in memory 142 is depends on the internal address and an offset determined from a value in a block register TCBPT'R. Host adapter 140 contains one 2-byte TCBPTR register for each mode, and all of the TCBPTR registers correspond to the same internal addresses.

Each S/G list contains scatter/gather elements that have programmable size. In particular, two bits in block register SIZESELECT select the size of each scatter/gather element and consequently selects the maximum number of elements per a scatter/gather list. The possible scatter/gather list configurations include sixteen 4-byte elements, sixteen 8-byte elements, eight 16-byte elements, or four 32-byte elements per SIG list. Each S/G list contains sixty-four 2-byte pages. MTPE 250 uses internal addresses 060h and 061h to access a page in a scatter gather list but can only access a SIG page in the send and receive modes (modes 0 and 2.) Internal addresses 60h and 61h are the same addresses used for the EVAR page in the fiber channel modes (modes 1, 3, and 5). Thus, the S/G list is not accessible in the fiber channel modes. The external address for the current S/G page depends on values in block registers TCBPTR and SG_CACHEPTR. In particular, the value in register TCBPTR for the current mode identifies a current TCB page and a S/G list following the current TCB page, and the value in register SG_CACHEPTR for the current mode identifies a page within the S/G list following the current TCB page. When MTPE 250 switches between modes 0 and 2, the TCBPTR register for the new mode changes the scatter gather list, and the SG_CACHEPTR for the new mode changes the page within the SIG list.

Figure 4:
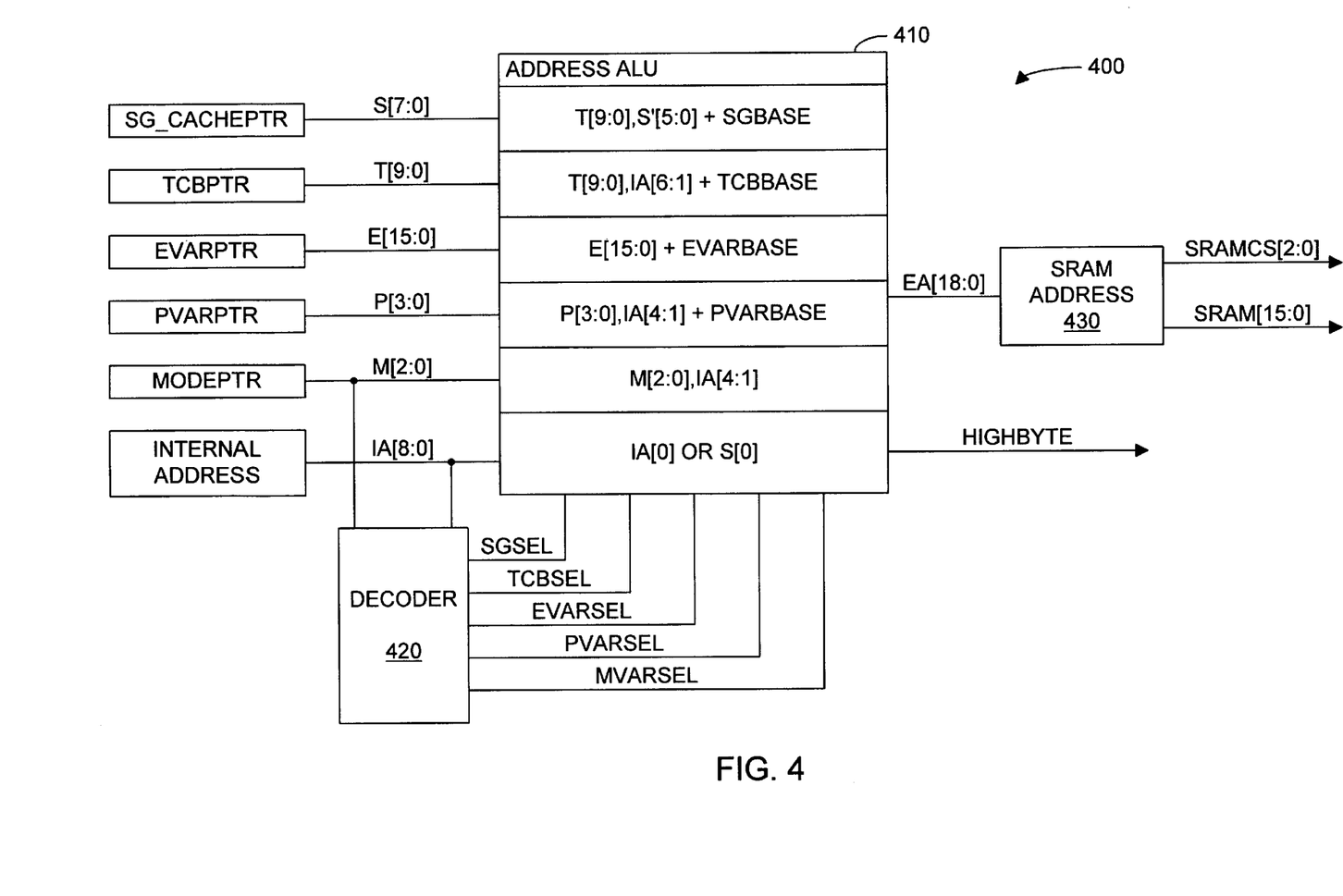
FIG. 4 is a block diagram of address conversion circuitry in accordance with an embodiment of the invention.

FIG. 4 shows a block diagram of an address conversion circuit 400 in accordance with an embodiment of the invention. Address conversion circuit 400 includes an address ALU 410 that calculates and selects an external address, a decoder 420 that identifies the memory section to which the internal address signal corresponds, and external address unit 430 which provides address, chip select, and other control signals to local memory 142. Address conversion circuitry 400 converts an internal 9-bit address IA[8:0] to an external 19-bit address EA[18:0]. The mapping from internal address IA to external address EA depends on the 3-bit mode number M[2:0] from global register MODEPTR, a 4-bit PVAR page number P[3:0] from global register PVARPTR, a 16-bit EVAR page number from block register EVARPTR, a 10-bit TCB page number T[9:0] from block register TCBPTR, and an element number and an offset represented by an 8-bit signal S[7:0] from block register SG_CACHEPTR. Registers MODEPTR, PVARPTR, EVARPTR, TCBPTR, and SG_CACHEPTR are coupled to apply the required signals to an address ALU 410. Address ALU 410 calculates five separate external address, one each for the MVAR section, the PVAR section, the EVAR section, a TCB page, and a SIG list. Decoder 420 decodes the internal address IA to determine which, if any, of the sections of local memory corresponds to the internal address. If the internal address is in any of the memory section, ALU 410 selects as output signal EA[8:0] the external address calculated for the section that decoder 410 identified.

If the address corresponds to global or block register, circuitry (not shown) handles the address internally to access the appropriate register. In particular, for global registers, internal address bits IA[5:0] select one of the global registers. For block registers, mode signal M[2:0] selects a register set, and internal address signal IA[7:0] selects a register within the selected register set.

Since the external memory in the exemplary embodiment uses 2-byte storage locations and internal addresses are to 1-byte storage locations, address ALU 410 output a signal HIGHBYTE to indicate whether the high or low byte of the 2-byte storage location is being accessed. Signal HIGH-BYTE is the same as the least significant bit (IA[0]) of the internal address except when accessing an S/G list. As described below, when the internal address IA is 060h or 061h in mode 0 or 4, signal HIEHBYTE is equal to bit S[0]. When the access is a read, signal HIGHBYTE determines which byte of a 2-byte value read from the local memory, is returned. When the access is a write, signal HIGHBYTE controls byte enables of a memory chip being accessed. Alternatively, if the external addresses are address of bytes, signal HIGHBYTE is a least significant bit that can be concatenated with the external addresses determined as indicated below.

If the internal address is in the MVAR section, internal address bits IA[4:1] are the four least significant bits of the external address EA[3:0]. Three-bit mode signal M[2:0] provides the next three bits EA[6:4] of the external address. The remaining most significant external address bits EA[118:7] are zeros.

If the internal address is in the PVAR section, the external address is a sum of a base address PVARBASE and an intermediate address determined from signals P and IA. Base address PVARBASE depends on the size of the MVAR section and has a fixed value (80h) in the exemplary embodiment of the invention. The intermediate address has four lease significant bits equal to internal address bits 1A[4:1]. The four following bits of the intermediate address are bits P[3:]. Address ALU 410 relies on software to ensure that value P[3:0] is within the range indicated by the selected size for the PVAR section. After determining the sum of intermediate address and base address PVARBASE, the remaining most significant bits in the external address are zeros.

The internal addresses 060h and 061h are in the EVAR section if MTPE 250 is in mode 1, 3, or 5. If the internal address is in the EVAR section, the external address is a sum of a base address EVARBASE and the 16-bit EVAR page number E[15:0]. Base address EVARBASE depends on the sizes of the PVAR and MVAR sections and can be set in ALU 410 during system initialization. In one embodiment, ALU 410 requires software to keep signal E[15:0] consistent with the sizes of the EVAR section. Alternatively, ALU 410 selects bits from signal EVAR For example, for 128 2-byte EVAR pages, ALU can add a 7-bit value E[6:0] to address EVARBASE to determine the external address EA. For 256 or 512 2-byte EVAR pages, ALU 410 can add an 8-bit value E[7:0] or a 9-bit value E[8:0] to address EVARBASE.

If the internal address is in the TCB section, the external address is a sum of a base address TCBBASE and an intermediate address determined from signals T and IA. Base address TCBBASE depends on the sizes of the EVAR, PVAR, and MVAR sections and can be set in ALU 410 during system initialization. The intermediate address has six least significant bits equal to internal address bits IA[6:1]. The ten following bits of the intermediate address are bits T[9:0]. After determining the sun of intermediate address and base address PVARBASE, ALU 410 pads the external address EA with zeros on the left.

The internal addresses 060h and 061h correspond to bytes in a scatter/gather list, if MTPE 250 is in mode 0 or 2. If the internal address is in a scatter/gather list, the external address is a sum of a base address SGBASE and an intermediate address determined from signal T and S. Base address SGBASE depends on the sizes of the EVAR, PVAR, and MVAR sections and is greater than base address TCBBASE by the size of a TCB page, e.g., 40h greater for 2-byte storage locations.

The intermediate value is a concatenation of six least significant bits S'[5:0] derived from signal S[7:0] and 10-bit value T[9:0]. Which bits of signal S[7:0] are bits S'[5:0] depends on the configuration of the S/G list. In the exemplary embodiment of the invention register SG_CACHEPTR includes a pointer to a 2-byte page in a S/G list and identifies the high or low byte from the page. In particular, least significant bit S[0] indicates either a high or low byte from a 2-byte storage and is used for generating signal HIGHBYTE. The pointer can be divided into a S/G element number and an offset (in 2-byte increments) within the S/G element. In most scatter/gather list configurations, the S/G element number is in bits S[7:4], and the offset is left justified in bits S[3:1]. In the configuration where the scatter/gather list contains four 32-byte elements, the S/G element number is in bits S[7:5], and the offset is in bits S[4:1]. The intermediate value S[5:0] depends on the number of elements in a scatter/gather list and the size of each element as follows. For sixteen 4-byte elements, bit S'[0] is bit S[3], bits S'[4:1] are bits S[7:4], and bit S'[5] is zero. For sixteen 8-byte elements, bits S'[1:0] are bits S[3:2], and bits S'[5:2] are bits S[7:4]. For eight 16-byte elements, bits S'[2:0] are bits S[3:1], and bits S'[5:3] are bits S[6:4]. For four 32-byte elements, bits S'[3:0] are bits S[4:1], and bits S'[5:4] are bits S[6:5]. External address EA[18:0] is the sum of base address SGBASE and the concatenation of signals T[9:0] and S'[5:0] padded to the left with zeros.

External address unit 430 converts the external address EA[18:0] into a 16-bit address SRAM[15:0] for a memory chip and a chip select signal SRAMCS[2:0].

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. An integrated circuit comprising:
   a circuit unit operable in a plurality of modes, wherein each mode corresponds to a different function of the integrated circuit, and in each mode, the circuit unit uses a first range of internal addresses to access a page in a first section of a memory; and
   a plurality of register sets, each register set corresponding to one of the plurality of modes and being accessible by the circuit unit when the circuit unit operates in the mode corresponding to the register set, wherein:
   the plurality of register sets includes a first register set that the circuit unit can access when operating in a first mode and a second register set that the circuit unit can access when operating in a second mode;
   the first register set includes a first register that identifies a page in the first section that the circuit unit accesses using the first range of addresses when the circuit unit operates in the first mode; and
   the second register set includes a second register that identifies a page in the first section that the circuit unit accesses using the first range of addresses when the circuit unit operates in the second mode.

2. The integrated circuit of claim 1, wherein:
   in the first mode, the circuit unit uses a first internal address to access the first register; and
   in the second mode, the circuit unit uses the first internal address to access the second register.

3. The integrated circuit of claim 1, further comprising a set of global registers that the circuit unit can access in any of the plurality of modes.

4. The integrated circuit of claim 3, wherein the set of global registers includes a first global register that identifies a current mode in which the circuit unit is operating, the current mode being selected from among the plurality of modes.

5. A circuit comprising:
   a memory comprising a first section that includes a plurality of pages and a second section that includes a plurality of pages;
   a circuit unit operable in a plurality of modes, the circuit unit using a first range of internal addresses to access a page in the first section of the memory;
   a plurality of register sets, each register set corresponding to one of the plurality of modes and being accessible by the circuit unit when the circuit unit operates in the mode corresponding to the register set; and
   a set of global registers that the circuit unit can access in an of the plurality of modes, the set of global registers includes a first global register that identifies a current mode in which the circuit unit is operating, wherein:
   in the plurality of register sets includes a first register set that the circuit unit can access when operating in a first mode and a second register set that the circuit unit can access when operating in a second mode;
   the first register set includes a first register that identifies a page in the first section that the circuit unit accesses using the first range of addresses when the circuit unit operates in the first mode; and
   the second register set includes a second register that identifies a page in the first section that the circuit unit accesses using the first range of addresses when the circuit unit operates in the second mode;

the circuit unit uses a second range of internal addresses to access a page in the second section of the memory; and the first global register identifies which page in the second section currently corresponds to the second range of addresses.

6. The integrated circuit of claim 1, further comprising a configuration register, wherein:

in each of the modes the circuit unit uses a second range of internal addresses to access a page in a second section of the memory; and the configuration register contains a value indicating sizes of the first and second sections.

7. The integrated circuit of claim 6, wherein:

the first register set includes a third register that identifies a page of the second section that the circuit unit accesses using the second range of addresses when the circuit unit operates in the first mode; and the second register set includes a fourth register that identifies a page of the second section that the circuit unit accesses using the second range of addresses when the circuit unit operates in the second mode.

8. The integrated circuit of claim 1, wherein:

the circuit unit uses a second range of internal addresses to access a page in a second section of the memory;

the first register set includes a third register that identifies a page of the second section that the circuit unit accesses using the second range of addresses when the circuit unit operates in the first mode; and the second register set includes a fourth register that identifies a page of the second section that the circuit unit accesses using the second range of addresses when the circuit unit operates in the second mode.

9. The integrate circuit of claim 1, wherein the integrated circuit comprises a host adapter.

10. The integrated circuit of claim 9, wherein the plurality of modes includes a first mode and a second mode, wherein the host adapter operates in the first mode for transfers to or from a host computer, and the host adapter operates in the second mode for transfers to or from a peripheral bus.

11. The integrated circuit of claim 1, further comprising an interface for the memory, wherein the interface converts a internal addresses used by the circuit unit to external addresses used by the memory.

12. The integrated circuit of claim 11, wherein:

in the first mode, the interface uses information from the first register to generate a first external address from a first internal address; and in the second mode, the interface uses information from the second register to generate a second external address from the firs internal address.

13. A host adapter comprising:

a sequencer operable in a first mode for transfers to or from a host computer and in a second mode for transfers to or from a peripheral bus;

a first register set coupled to for the sequencer to access using a first range of internal addresses while the sequencer operates in the first mode;

a second register set coupled for the sequencer to access using the first range of internal address while the sequencer operates in the second mode; and a memory interface for control of a memory that comprises a section allocated for transfer control blocks, wherein:

the first register set includes a first register for a pointer that points to a transfer control block accessible to the sequencer using a second range of internal addresses while the sequencer operates in the first mode; and The second register set includes a second register for a pointer that points to a transfer control block accessible to the sequencer using the second range of internal addresses while the sequencer operates in the second mode.

* * * * *